May 24, 1966 G. R. PHILLIPS ET AL 3,253,170
QUIET FLUX-SWITCH ALTERNATOR

Filed Feb. 12, 1963 9 Sheets-Sheet 2

INVENTORS
Graham R. Phillips
John Henderson
John C. Andreas
BY Orm R. Severn
THEIR ATTORNEY

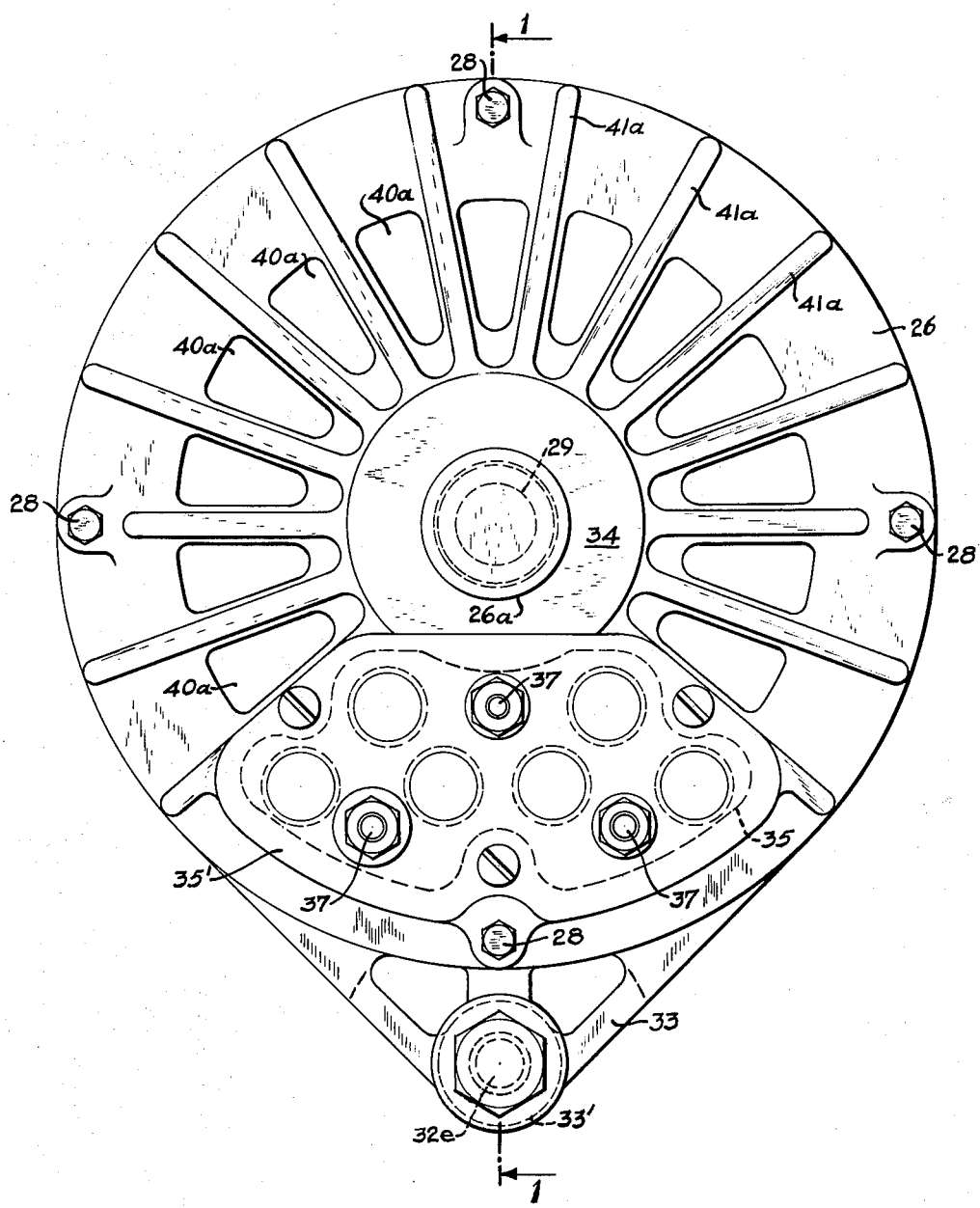

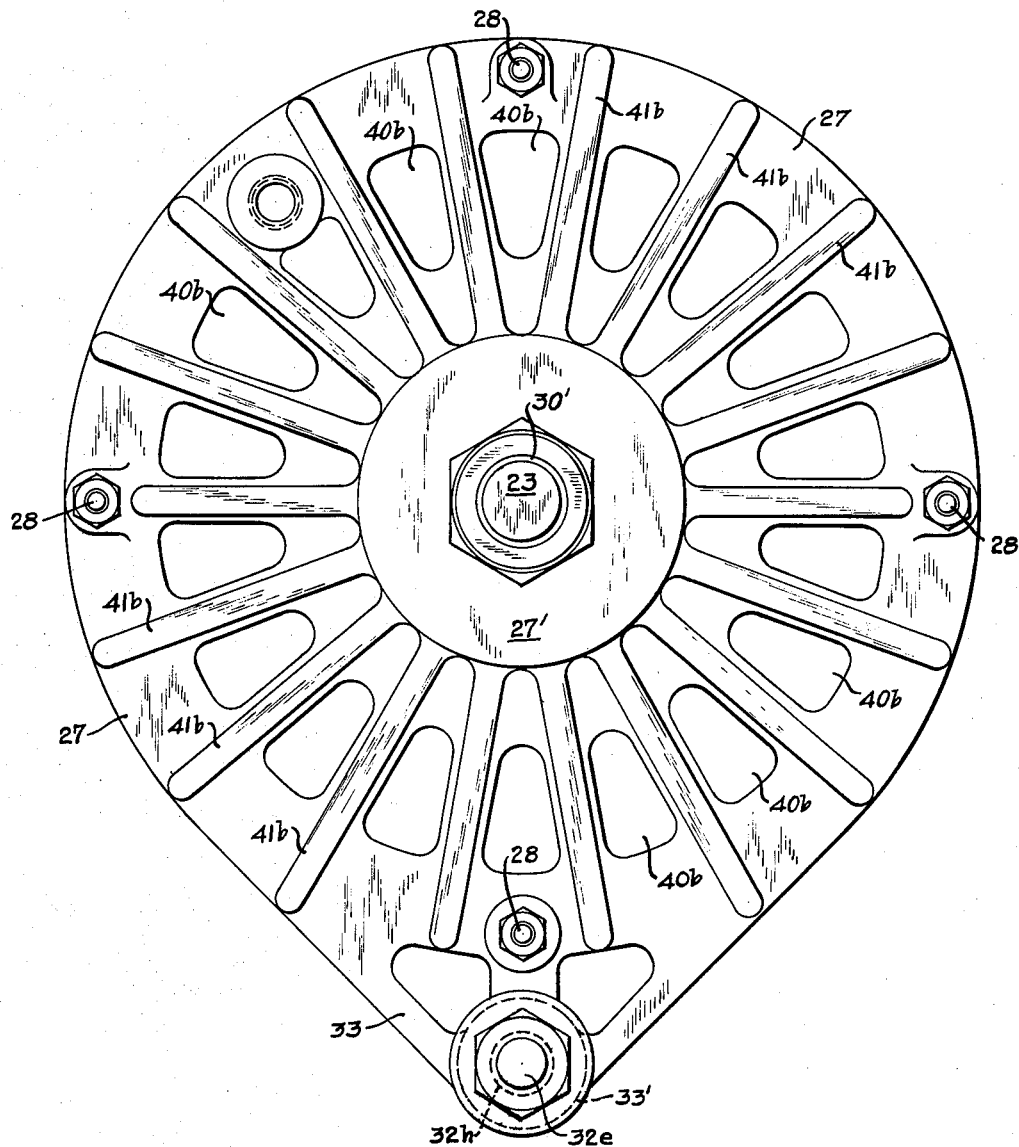

May 24, 1966     G. R. PHILLIPS ET AL     3,253,170
QUIET FLUX-SWITCH ALTERNATOR
Filed Feb. 12, 1963
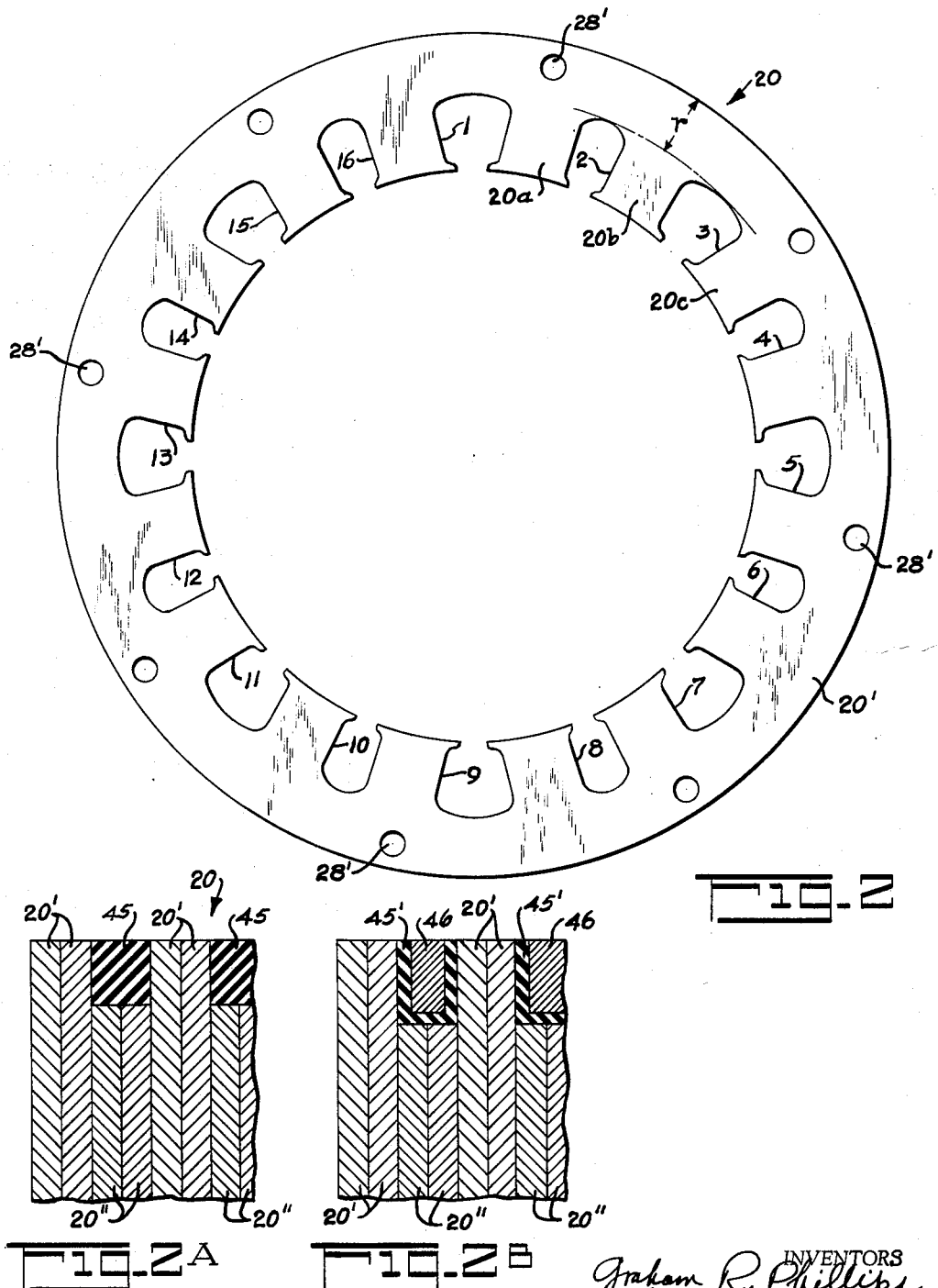

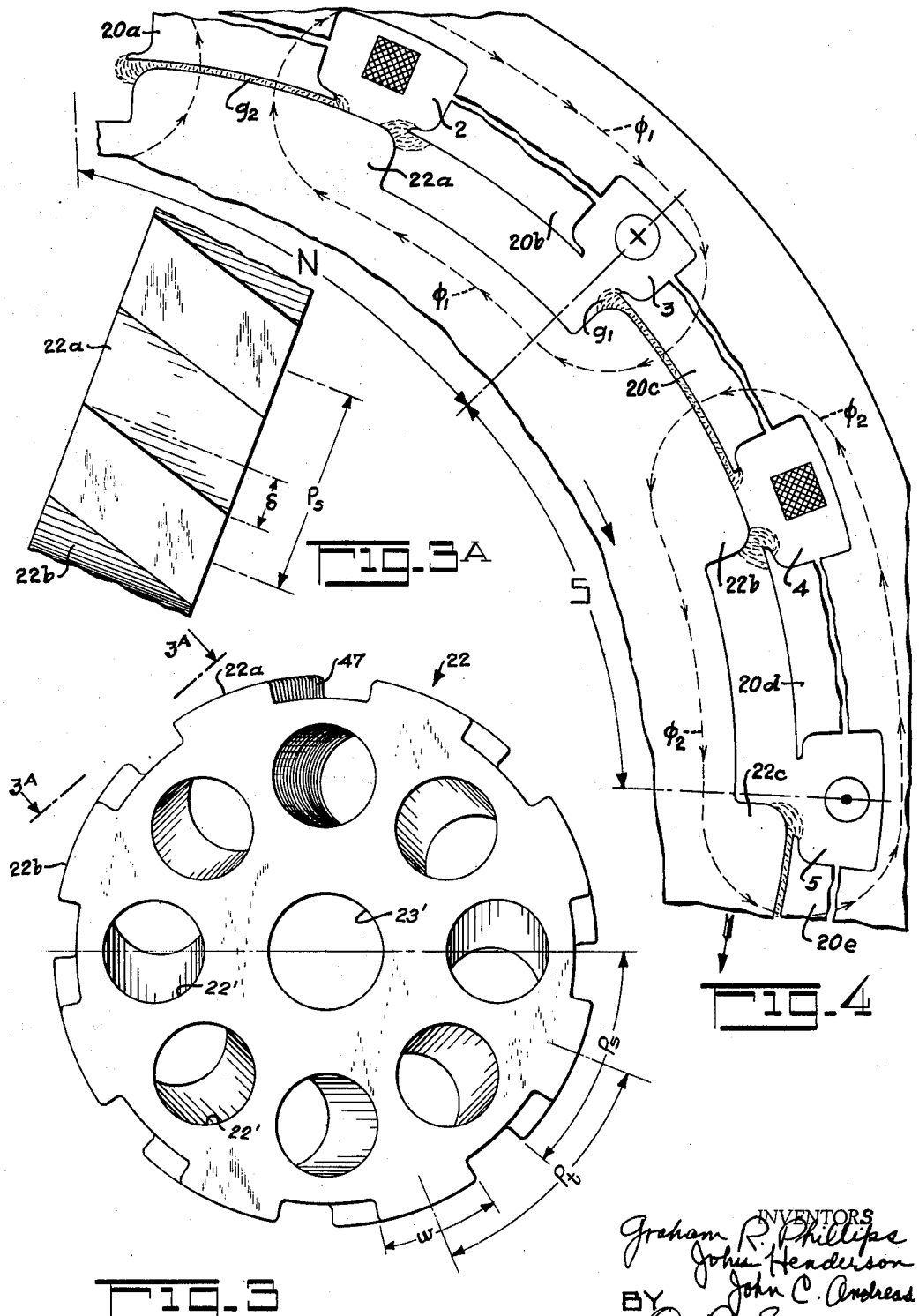

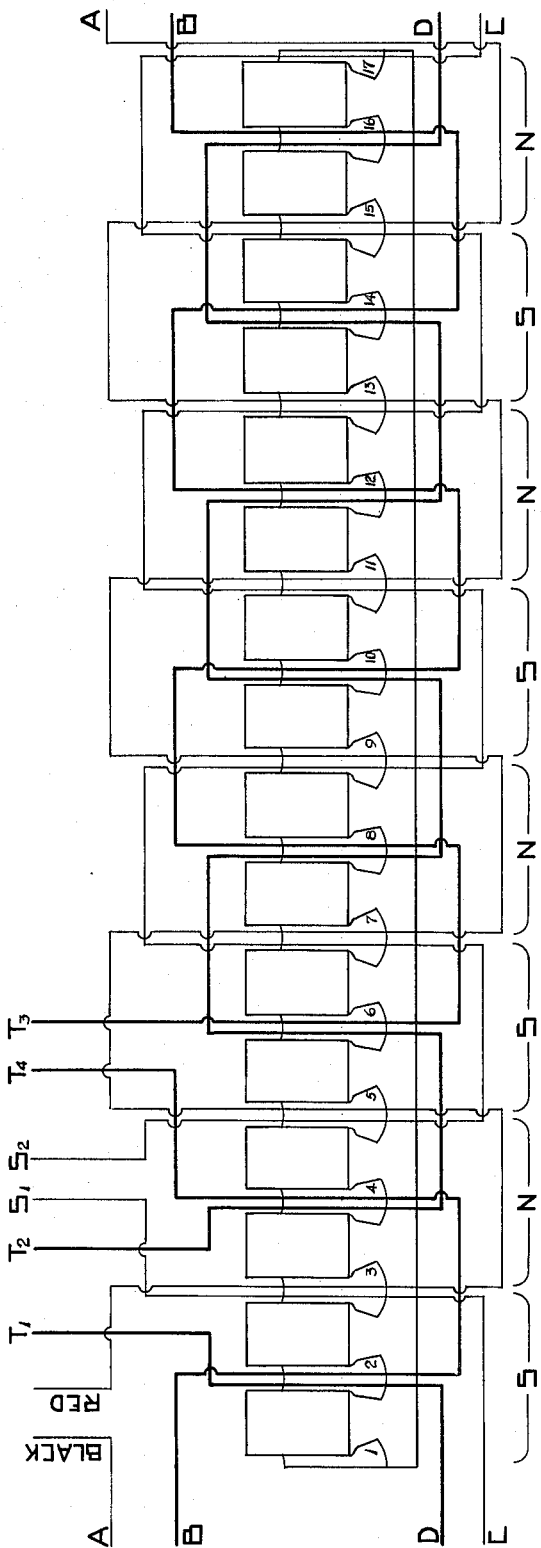

May 24, 1966  G. R. PHILLIPS ET AL  3,253,170
QUIET FLUX-SWITCH ALTERNATOR
Filed Feb. 12, 1963  9 Sheets-Sheet 8
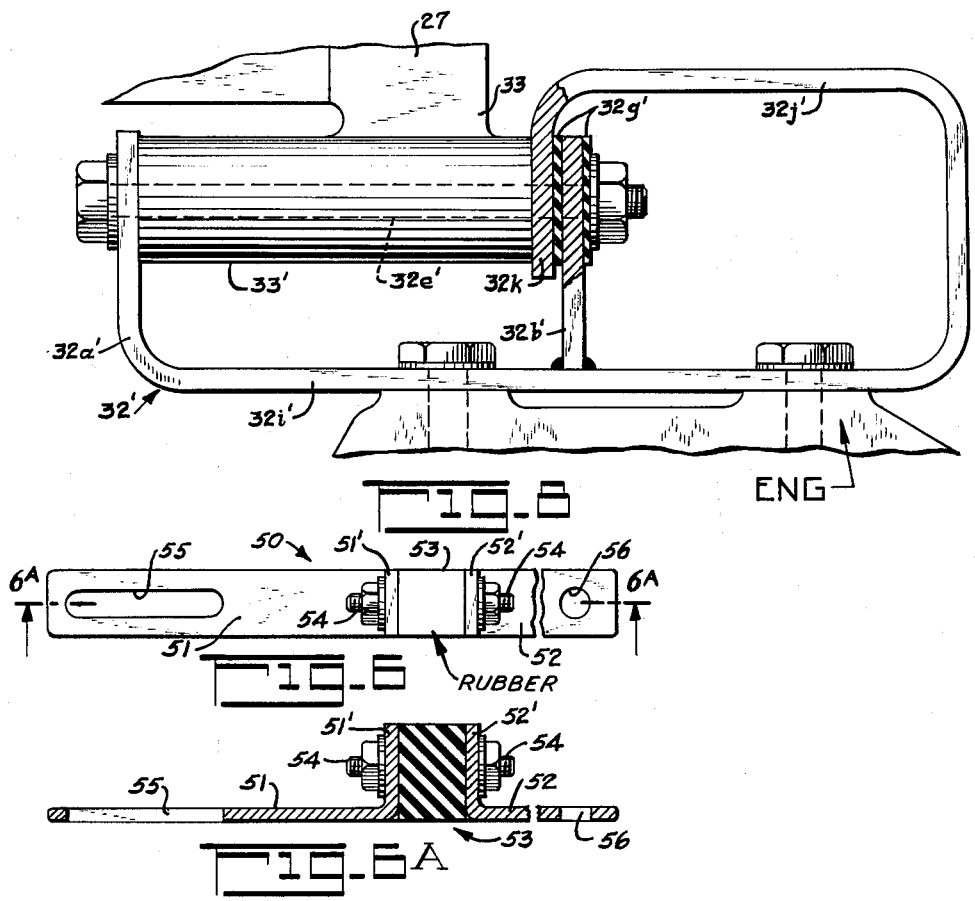
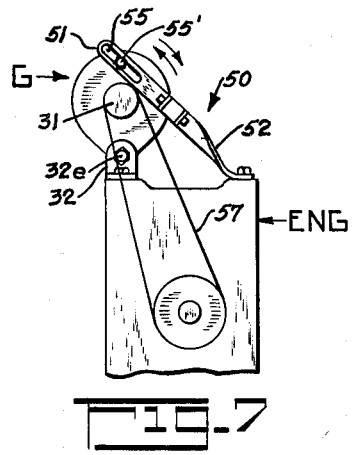
INVENTORS
Graham R. Phillips
John Henderson
John C. Andreas
BY Orin R. Severn
THEIR ATTORNEY

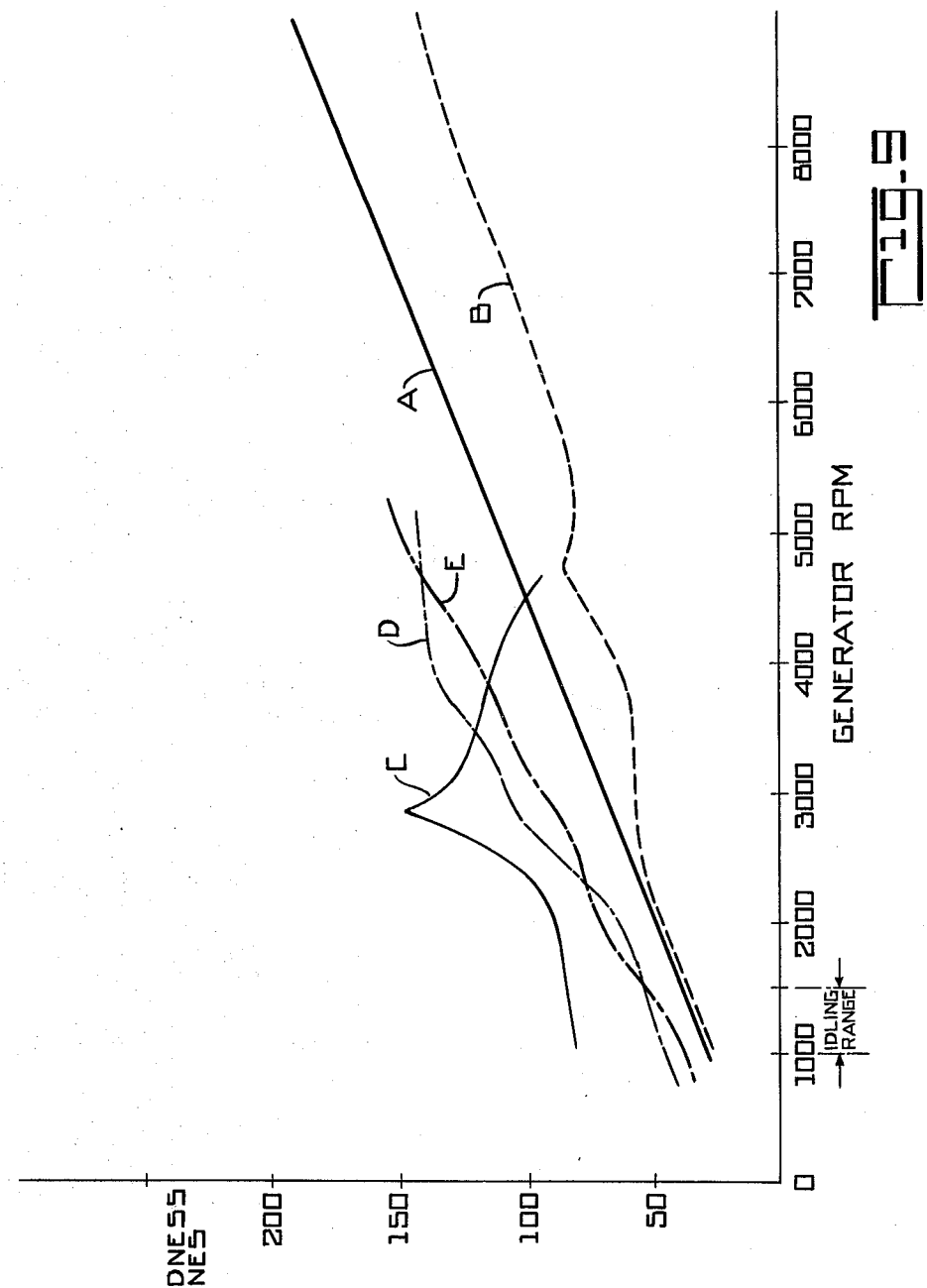

United States Patent Office 3,253,170
Patented May 24, 1966

3,253,170
QUIET FLUX-SWITCH ALTERNATOR
Graham R. Phillips, Utica, and John Henderson, Warren, Mich., and John C. Andreas, St. Louis, Mo., assignors to Curtiss-Wright Corporation, a corporation of Delaware
Filed Feb. 12, 1963, Ser. No. 258,028
14 Claims. (Cl. 310—168)

This invention relates to electric alternators or generators that operate according to the "flux-switch" principle, an example being shown and described in a copending application Serial No. 41,412, now Patent No. 3,173,076, filed July 7, 1960, by Harold T. Adkins for "High Speed Generator," and assigned to the same assignee as the present invention. In brief, this type generator comprises a stator in which both the field and power windings are mounted, and a highly permeable magnetic rotor structure having circumferentially-spaced projections or teeth. The stator also has formed thereon at its inner circumference spaced teeth that constitute magnetic field poles. The rotor which is generally driven at high speed performs a flux-switching operation wherein the field flux linking a given power winding coil is alternately reversed in sense as a rotor tooth moves past stator teeth constituting N–S field poles. At a given rotor speed this flux change in turn induces a high frequency alternating current in the stator power winding that can, for example, be rectified and used for battery charging and other purposes.

The flux-switch generator has several practical advantages. For example, as the rotor carries no windings, commutator brushes or slip rings are not required; it also follows that the rotor can be more compactly and ruggedly constructed so as to be capable of withstanding high speed centrifugal forces.

Notwithstanding these and other advantages, acoustic difficulties have been encountered where this type generator is used in a passenger or commercial vehicle for battery charging and the like. That is, in normal operation the generator noise is quite noticeable above the usual vehicle and engine noise, especially in the lower and middle ranges of engine speed. Car drivers in general find any noticeable auxiliary noise very objectionable, and, therefore, car manufacturers have been reluctant to use flux-switch type generators previously available.

Heretofore, little progress had been made in solving this noise problem, as the basic causes were not understood. The problem was furthermore complicated by the appearance of comparatively high noise levels within intermediate speed ranges.

A principal object of this invention therefore is an improved flux-switch generator that is quiet in operation so as to be acceptable for use in passenger and commercial vehicles, and that retains advantages inherent in this type generator, including characteristic electrical and mechanical operating efficiency.

Essentially, we have found that the generator noise is due primarily to mechanical vibrations set up in the stator and rotor structures according to the magnitude and spectrum positions of "forcing frequencies" representing the rapid interaction of magnetic forces between rotor and stator. These forcing frequencies vary according to the speed and design of the generator, thus introducing the further possibility of a serious resonant condition, were the natural period of vibration of a basic element of the generator to be matched by a forcing frequency. In accordance with the present invention, the generator noise due to such frequencies is either substantially eliminated or greatly reduced to tolerable amounts by reducing the basic generator frequency so that resulting noise is in the less sensitive aural range, thus lowering the upper limits of forcing frequencies, and by modifying the stator and rotor structural configurations so as to increase respectively the natural periods of stator and rotor vibration above the upper limits of forcing frequencies, all without departing from practical considerations of design and operating characteristics; furthermore, the above improved features are combined advantageously with directional damping for minimizing all significant generator vibration.

The invention will be more fully set forth in the following description referring to the accompanying drawings, and the features of novelty will be pointed out wtih particularity in the claims annexed to and forming a part of this specification.

Referring to the drawings,

FIG. 1B is an end view of the generator taken in part along the line 1B—1B of FIG. 1;

FIG. 1C is a view of the rotor-drive end of the generator taken in part along the line 1C—1C of FIG. 1;

FIG. 2 is a plan view of the generator stator ring;

FIG. 2A is a partial view of the cross-sectional area of the laminated stator at its outer periphery showing damped dual-diameter laminations;

FIG. 2B is a similar view showing a modified form of lamination damping means;

FIG. 3 is a plan view of the rotor illustrating rotor tooth skewing;

FIG. 3A is a view of a plane development of the rotor periphery surface taken along an extended line 3A—3A of FIG. 3 showing rotor lamination and tooth skewing through an angle defined by a subtended arc $\delta$;

FIG. 4 is a plan view showing the respective configurations of a sector of cooperating stator and rotor teeth in relation to field flux paths;

FIG. 4A is a linearly developed schematic illustration of the stator field and power windings;

FIGS. 6 and 6A are plan and sectional views respectively of a vibration damping arm for tension adjustment of the power belt;

FIG. 7 is a partly schematic illustration of application of the belt tension adjusting arm;

FIG. 8 illustrates an alternative form of flexible vibration damping mounting for the generator; and FIG. 9 is a chart illustrating varying performances of several flux-switch generators at different speeds with respect to a noise scale standard that is acceptable to a major car manufacturer.

Figure 1:
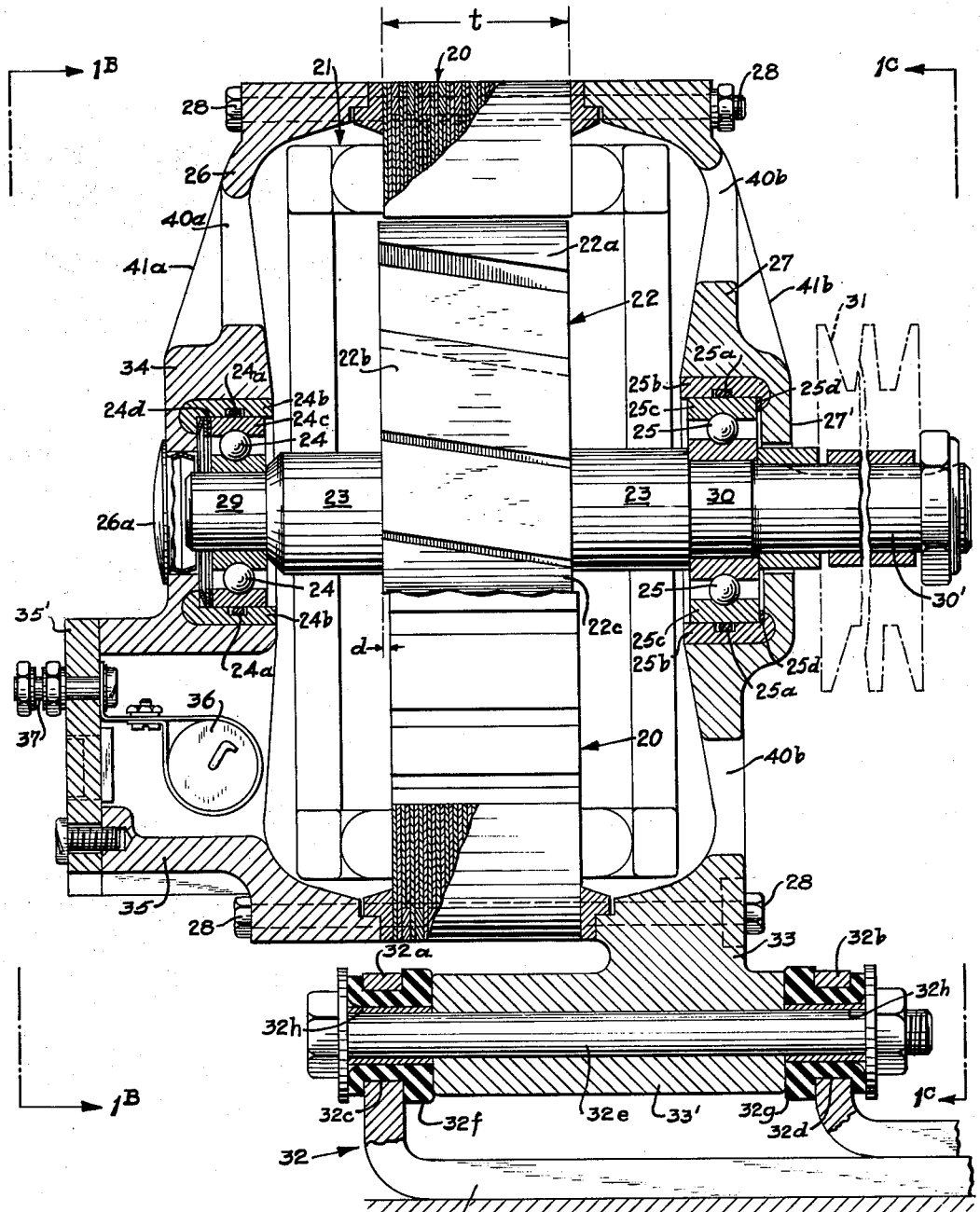
FIG. 1 is a sectional view, partly broken away, of a flux-switch generator embodying the present invention, taken in part transversely of the longitudinal axis of the rotor and generally along the line 1—1 of FIG. 1A.

The generator G shown in FIG. 1 comprises essentially a laminated ring-like stator structure 20 composed of a highly permeable material, such as iron, having slots 1, 2, 3, etc. (FIG. 4A) in which the electrical windings, generally indicated at 21, are mounted, and a laminated rotor 22 of similar material that is partly broken away to show a portion of the inner circumference of the stator ring. The rotor has spaced teeth 22a, 22b, etc. that form corresponding radially extending air gaps with the stator and is mounted on a drive shaft 23. This shaft is supported by spaced bearings 24 and 25, that in turn are supported by and mounted respectively within opposite end-plates or support brackets 26 and 27. As shown, the stator is clamped between the end-plates by through-bolts 28, FIGS. 1, 1B, and 1C, thereby making the unit self-contained, so that an outer casing is not required.

The rotor shaft 23 at the support points is provided with journal portions 29 and 30 that engage the respective rotor bearings 24 and 25. The bearings shown are of conventional ball-bearing type. The rotor shaft at its driven end extends through the bearing 25 and end-plate 27 for operative connection with the engine or prime mover, as for example through a suitable belt-driven pulley, gearing, etc., generally indicated at 31, FIGS. 1 and 7. These bearings are further provided with directional damping means for preventing any substantial lateral vibration of the rotor assembly along its longitudinal axis, i.e. the longitudinal axis of the shaft 23. Minimizing of vibration in this mode reduces correspondingly the noise produced by any interaction between the rotor, the bearings, and the main support bracket.

This directional damping arrangement has a dual function, namely, (a) Frictional drag at the outer race of each ball-bearing in a direction parallel to the shaft axis, as by means of compressed rubber-like O-rings 24a and 25a seated in annular recesses as shown in the bearing support sleeves 24b and 25b respectively, so as to press tightly against the adjacent surfaces of the outer races 24c and 25c, and (b) Compression damping and biasing in the aforesaid direction between each outer race 24c and 25c and the respective end supports. Here, referring specifically to enlarged FIG. 1A, damping rings or gaskets 24d and 25d of rubber, etc. are interposed between the outer ends of the bearing races 24c and 25c respectively, and the end supports for directly opposing any lateral vibration of the rotor. In addition, the outer bearing race 24c is mechanically biased in the direction of end support 27 by a spring washer or the like 24e that seats on a retaining ring 24f facing the damping ring 24d.

The latter function (b) is supplemented by a separate biasing force (magnetic) urging the rotor shaft longitudinally toward the main end-plate support (or bracket) 27. The aforesaid magnetic biasing force results from a slight lateral offsetting of the rotor with respect to the stator ring as indicated at dimension $d$. This axial displacement results in corresponding axial displacement of the radial air gap and produces during normal operation a lateral magnetic force component tending to center the rotor, thereby urging it toward the main end support at 27. The combined effect therefore of the frictional drag at the O rings, the lateral damping at the opposite aperiodic rings 24d and 25d and the complementary mechanical and magnetic force biasing described above, is to hold the rotor in a steady lateral position so that vibration or oscillation of the rotor assembly in this mode is for practical considerations precluded.

The generator is supported on a vibration damping mounting 32, FIG. 1, that is connected to a lower extension 33 of the end-plate 27. The mounting may comprise a pair of rugged, laterally spaced, vertically positioned bracket members 32a and 32b that are rigidly mounted in suitable manner by lateral base straps as shown, to the engine or other fixed support. The brackets have aligned bores 32c and 32d for receiving a through-bolt 32e that clamps a pair of rubber damping bushings 32f and 32g between the brackets and an elongated support sleeve 33' formed at the end of the end-plate support extension 33. A spacing bushing 32h is positioned between each bracket and the sleeve 33'. This mounting will also be discussed later in more detail in connection with vibration problems.

The opposite end-plate 26 provides a bearing hub or housing 34 for the bearing 24 at the free end of the rotor shaft, and also is formed at its lower side to provide a pocket or housing 35 for output circuit elements such as rectifiers, etc. (indicated at 36) that are suitably connected to terminals on the cover plate 35' as at 37 for use in a battery charging system or the like, FIG. 5. The rectifiers (diodes, etc.) may conveniently be mounted as shown on the removable cover plate 35', thereby permitting ready servicing of diodes. The diodes are cooled by conduction of heat to the end-plate support 26 constructed of aluminum, which in turn is cooled by air flow through the openings 40a. The housing opening opposite the shaft end may also be closed by a suitable sealing cap 26a having a friction grip as shown.

The mounting for the generator proper therefore constitutes essentially the independently mounted end-plate 27 that in turn houses (in the plane of the end-plate) the rotor support bearing 25 at the driven end of the rotor shaft. Thus, this end-plate carries in cantilever manner the remainder of the unit.

Summarizing, the generator is, in effect, mounted on a rugged, compact, vertical post or bracket in a compact cantilever manner, such that the usual shaft distortion and bending stresses are either greatly reduced or eliminated, referring specially to the shaft journal at 30. This also ensures against distortion of the rotor shaft during final assembly and mounting with accompanying vibration and undue bearing wear, which in itself can result in a noisy machine.

The configurations of the end-plates 26 and 27 are shown in FIGS. 1B and 1C respectively. Referring first to FIG. 1B, the end-plate 26 has formed therein a plurality of circumferentially-spaced ventilating openings 40a for generator cooling purposes. Buttress-like ribs 41a extend radially from the central hub or bearing housing 34 to the outer periphery of the plate, FIGS. 1 and 1B. The end-plate is thereby strengthened and made sufficiently rugged so that any vibrations ordinarily due to "diaphragming" of the end-plate are effectively precluded. The remaining structure of the end-plate 26 is identified with that previously described by similar reference numerals in FIG. 1.

The opposite end-plate 27 at the support end of the generator, referring to FIG. 1C, is generally similar in construction as it also includes ventilating openings 40b and radially extending buttresses or ribs 41b, FIGS. 1 and 1C. The end-plate 27 as shown in FIG. 1C illustrates the support extension 33 terminating in the support sleeve 33', that in turn is mounted on the base support 32, FIG. 1.

It will be noted that the bearings are located in the end-plate supports or brackets 26 and 27 with the center line of the balls at 24 and 25 directly in line with the center of the respective reinforcing ribs 41a and 41b of the end supports, thereby providing a direct radial support to the rotor. This construction of the end supports and bearings resists any tendency toward either axial or transverse vibration of the rotor unit within the alternator proper.

As indicated in FIG. 1, a suitable number of through-bolts 28 interconnect the end-plates of FIGS. 1B and 1C for clamping therebetween the stator ring. This forms a simple, compact generator unit supported solely from the end-plate 27 that in turn constitutes, as described above, a rugged, vertically positioned bearing support for the drive end of the rotor shaft, thus leaving the opposite end free.

FIG. 2 shows the stator configuration in plan. A stator lamination 20' is indicated as consisting of a thin ring-like stamping of highly permeable iron, the stacked laminations being slotted at the inner circumference to form recesses 1, 2, 3, etc. for the generator windings. The slots for the field winding are indicated by odd numbers, and these alternate with the slots for the power winding indicated by even numbers, the former being preferably wider to provide increased wire space for field copper, thereby allowing lower field currents and, incidentally, a less expensive voltage regulator. The disposition of the windings is best shown by the linear development in FIG. 4A which will be described later in connection with FIG. 4.

The stator slots all have the same depth so that the radial thickness $r$ of the stator between the slots and outer periphery is constant. This dimension is significant in the practice of the present invention as will presently be described. The stator structure between these slots is formed as shown to constitute magnetic pole pieces 20a, 20b, etc. of uniform width in relation to the rotor teeth, FIGS. 2 and 4. The laminations have aligned borings 28' for a suitable number of clamping bolts as previously described.

The outer peripheral edges of the stator laminations are preferably damped to eliminate any possible lamination peripheral vibration, and to this end the laminations may be of dual diameter as shown for example by the enlarged cross-sectional views, FIGS. 2A and 2B, of the outer diameter portion of the stator ring. FIG. 2A shows a pair of normal-diameter laminations 20' alternating with a pair of slightly reduced diameter laminations 20", the peripheral groove formed thereby at the stator periphery having mounted therein a tight fitting vibration damping ring 45 of rubber-like material. Where preferred, as in FIG. 2B, the damping ring 45' may be reinforced at its outer periphery by a reinforcing or stiffening ring 46 of suitable material mounted within a center groove formed in the damping ring 45'.

FIG. 3 is a plan view of the laminated rotor 22 illustrating in accordance with the invention, a skewed arrangement of the rotor teeth so as to improve smooth transition of magnetic flux from one stator tooth to the next for purposes of vibration control hereinafter described. The rotor is provided with a central bore 23' for receiving the rotor shaft 23, FIG. 1, and has concentrically arranged apertures as indicated at 22' for reducing the rotor weight and for heat dissipation. As shown, the rotor teeth are located in alignment with the web between the holes 22', thereby providing maximum rigidity of the rotor with respect to vibration caused by magnetic forces acting on the teeth.

The tooth skewing is produced by progressively offsetting the rotor laminations by incremental radians as indicated at 47 so as to skew the tooth through a predetermined subtended arc $\delta$ (or radians) as shown in FIG. 3A. This arc is preferably in the range of 15% to 25% of the slot pitch $p_s$ (in degrees of arc) for optimum result in terms of maximum output co-existent with minimum static torque. Further in accordance with the invention, the magnetic flux and torque variations are modified for optimum results in terms of maximum output with minimum static torque, by maintaining a ratio $w_t/p_t$ of from 45% to 55%, where $w_t$ is the width of a rotor tooth, and
$p_t$ is the rotor tooth pitch in degrees of arc.

FIGS. 4 and 4A illustrate respectively the magnetic coaction between the stator and rotor, and the electrical winding arrangements of the field and power coils in the stator. A one-wire diagram is herein shown for simplifying the disclosure.

Referring first to FIG. 4, the rotor 22 is indicated as moving in clockwise direction with respect to the stator 20. The field winding produces an 8-pole magnetic field at the inner circumference of the stator as diagrammatically shown in FIG. 4A wherein the shunt field winding is indicated connected to "Red" and "Black" by light lines in odd-numbered slots. In addition, a compound or series field is also shown in the field slots connected to terminal points $S_1$ and $S_2$. The power winding is shown in comparatively heavy lines in the even-numbered slots. (The references A, B, C, and D in FIG. 4A indicate as will be apparent corresponding internal conductors.)

The rotor has eight teeth, FIG. 3, and as the rotor turns, the rotor teeth line up first with one tooth of each stator field pole and then with the next tooth. This produces a primary magnetic force pattern on the stator in an 8-mode pattern. A power winding coil (indicated as cross-hatched), as in slots 2 and 4, spans two stator teeth in each pole, so that as the rotor turns, the magnetic flux linking a power winding "switches" in polarity.

That is, the rotor teeth 22a and 22b, referring to positions shown in FIG. 4, complete a magnetic circuit for the clockwise flux $\phi_1$ produced by the indicated direction current in field winding, slot 3, this magnetic circuit extending through the stator ring and stator tooth 20c, air gap $g_1$, rotor tooth 22b, rotor 22, rotor tooth 22a, air gap $g_2$, and stator tooth 20a to the stator ring. This magnetic circuit links the power winding, slot 2. In similar manner, the oppositely flowing current in field winding, slot 5, produces a counterclockwise flux $\phi_2$ that completes a corresponding magnetic circuit linking the power winding, slot 4.

Accordingly, it will be seen that as the rotor teeth advance one-half tooth pitch from the position shown (i.e. to align the rotor and stator teeth 22a and 20b), the flux $\phi_1$ now links the power winding, slot 4, and the flux $\phi_2$ now links a power winding, slot 6 (referring to FIGS. 2 and 4A) which formerly was linked by a field flux from winding, slot 7, corresponding to flux $\phi_1$. Thus, an alternating current in induced in the generator power winding.

The generator heating due primarily to the induced power current and to a lesser extent by hysteresis losses is dissipated by the disclosed cooling vents that form a communicating path laterally through the end-plates and rotor. The rotor vents as above described are angularly disposed with respect to the lateral (or shaft) axis, so that there is added induced air conduction according to well-known aerodynamic principles.

For preventing the generation of undesirable harmonics in the flux pattern as the rotor teeth move from one stator tooth to the next, FIG. 4, that could excite higher order resonant frequencies in the machine, the end corners of the rotor teeth are shaped according to the following criteria:

(a) The tooth face is ground to the arc of a circle concentric with the periphery of the rotor, for a length equal to the width of a stator tooth, subject to ±5% tolerance. This gives minimum air gap reluctance to the flux at alignment of a stator tooth and rotor tooth.

(b) The slot depth, i.e. tooth height, is made greater than 20 times the air gap length in order to give minimum flux leakage from the stator tooth which is aligned with the rotor slot.

(c) The indicated shape of the rotor tooth is such that as the rotor tooth moves away from one stator tooth and approaches the next one, referring for example to teeth 22b and 20d, FIG. 4, the increase in the flux leakage path from the rotor tooth to the stator tooth at the leading end, is the same as the decrease in the main flux from the rotor tooth to the stator tooth at the trailing end due to the increase in air gap reluctance. The total field flux thus remains the same as the rotor is advanced, and tangential forces that would result due to such flux change are thereby minimized. That is, the magnitude of any "forcing frequencies" due to such tangential forces is minimized.

Figure 5:
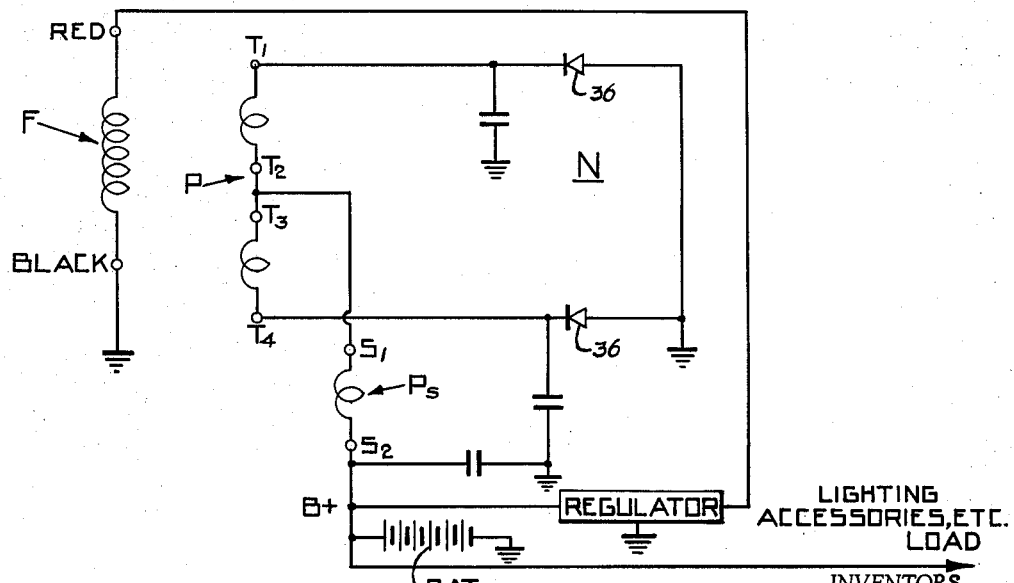
FIG. 5 is a circuit diagram illustrating one form of battery charging system that may be connected to the power output terminals of FIG. 4A.

The electrical output of the power winding may be used for various A.C. applications, or rectified for D.C. applications as required. A D.C. system for vehicle battery charging is shown by FIG. 5 wherein the winding terminal designations $T_1$ to $T_4$, $S_1$ and $S_2$ correspond to those of FIG. 4A. The system of FIG. 5 will be described briefly as it embodies a well-known form of circuitry. A voltage regulator as indicated provides current for the generator field winding F that is related as above described to the main power winding P. A conventional rectifying network N connected to the opposite terminals $T_1$ and $T_4$ of the power winding has the usual center tap connection, which includes the series field winding $P_s$, for double-wave rectification. The output of the rectifying network is connected at terminal $S_2$ to the voltage regulator and to the battery to be charged, BAT. The electrical load is connected as shown to the battery B+ terminal for the usual vehicle accessories, i.e. radio, lighting, etc.

Where the usual belt drive for the generator is used, a belt-tension adjusting arm with vibration damping may be used as shown in FIGS. 6, 6A, and 7 for preventing transmission of vibration from the generator to the engine through this path. The belt arm 50 comprises two strap-like metal sections 51 and 52 that are interconnected by a so-called "flex-bolt" 53 having two separate studs 54 interconnected by aperiodic material such as rubber, etc., for joining lateral offsets 51' and 52' of the arm sections. Thus, the belt arm 50 can hafe a low resonant frequency as compared with the free high-frequency vibrations of the generator unit.

For mounting and adjustment, the arm section 51 is provided with a slot 55 for adjustably coupling it to the generator, and section 52 has a bolt hole 56 for suitably mounting the arm to the engine block. This application is indicated schematically in FIG. 7 wherein the arm 50 is shown connected to the engine ENG at arm section 52, and to the generator unit G at the adjusting slot 55 of section 51. The generator is mounted to the engine generally in the manner of FIG. 1 so that it can be driven by a belt 57 from the engine shaft. Belt tension is adjusted by loosening a securing nut 55' at the slot 55 and rotating the generator as a unit either clockwise or counterclockwise, as the case may be, about the mount bolt 32e, FIG. 1, and then at the proper belt tension, tightening the securing nut at slot 55.

FIG. 9 illustrates the comparative test performances of a flux-switch generator constructed in accordance with the present invention, and three other flux-switch generators of the prior art. Curve A represents an acceptable car industry standard for judging generator noise in terms of generator r.p.m. Curve B shows the typical test performance of the present improved quiet generator, and curves C, D, and E show under comparable conditions individual test performances of three generators including two commercial types and one test-sample built according to prior knowledge of the art. It will be noted that the generator of the present invention meets full-range requirements, especially in the comparatively difficult idling and lower speed ranges, and also is well below acceptable noise in the higher speed ranges.

For a better understanding of the invention, the construction features of the quiet alternator or generator disclosed will be briefly reviewed with reference to what have been found to be primary sources of generator noise.

*Rotor noise suppression*

As previously indicated, it has been found that the noise from the rotor unit (i.e. rotor and shaft) is caused primarily by
(a) Rotor unit vibration with respect to the plane of rotation of the motor disk, i.e. laterally, and
(b) Rotor unit vibration transversely of the rotor disk plane.

Figure 1A:
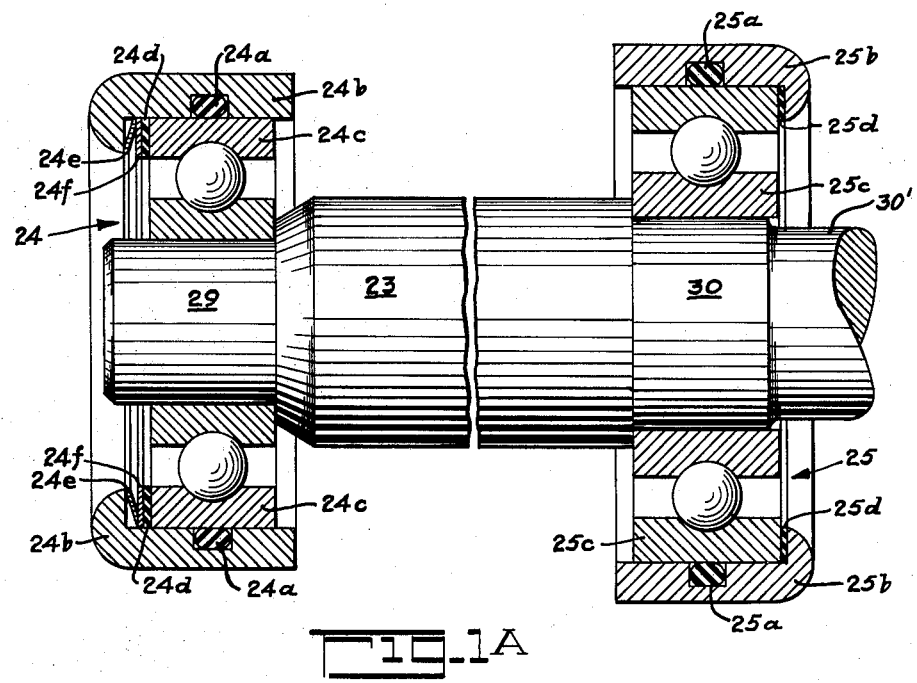
FIG. 1A is an enlarged detail view of directional damping means associated with the outer bearing of FIG. 1.

In accordance with this invention the noise caused by rotor vibration in these different modes is overcome respectively by
(a) The above-described rotor and bearing lateral bias and aperiodic damping arrangements, FIGS. 1 and 1A, which tend to maintain steady the plane of rotation of the high speed rotor, and
(b) An optimum design factor representing a lower limit for rotor rigidity or stiffness, namely $$\delta > 30 f^2_{(max)}$$

where $\delta$ is the rotor deflection at the rotor center between the bearing supports at 24 and 25, FIG. 1, where the rotor is subjected to a load 20 times the rotor weight along the magnetic portion of the rotor, as measured in inches, and $f_{(max)}$ is the upper limit of generator frequency in c.p.s. at which the generator must be quiet. In addition to the above optimum factor, the generator noise due to magnetic forcing frequencies is reduced by so skewing the rotor teeth, FIGS. 3 and 3A that the resulting flux variation in the stator teeth is for practical purposes sinusoidal. Theoretically, pure sine wave flux variations would reduce to zero the static torque required to move the rotor from one tooth to the next. Although this is not feasible in practice we have found that rotor tooth skewing of 15% to 25% of the rotor slot pitch, FIG. 3, is an optimum in terms of maximum output and minimum static torque; furthermore, advantageous flux variation is obtained as previously described by an optimum rotor tooth width-pitch ratio, namely $$w_t = p_t (.45 \text{ to } .55)$$

*Stator noise suppression*

Stator noise as above indicated has been found to result from lateral vibration, especially at resonant frequency of the stator ring proper and/or interlamination vibration at lamination resonant frequency. According to the invention, the former situation was overcome on an actual stator ring of a test generator by increasing the stator dimension $r$, FIG. 2, to an optimum value such that the resonant frequency of the stator ring is raised to about 24,000 c.p.s. for an 8-mode vibration, which is well above any forcing frequencies present during normal operation. The dimension $r$, i.e. radial depth of the stator ring exclusive of stator teeth, in relation to the total surface area S (equal to $\pi D^2/4$) of the stator lamination, FIG. 2, has been found to be a proper measure of stator rigidity, where $$S/r > 18,800/f_{(max)}$$

where D is the outside diameter of the stator lamination in inches, $r$ is in inches, and $f_{(max)}$ in c.p.s., as in the above rotor formula.

Secondly, magnetic forces due to air gap variations, bearing clearances, mechanical vibration, etc. can excite the stator in lower modes of vibration. The natural frequency for a 2-mode vibration of the present stator is about 1150 c.p.s. Here the comparatively heavy section of stator core puts this resonant frequency at a spectrum position where the forcing frequencies which could excite it are at a generator speed of about 4300 r.p.m., which is in the range where engine noise would mask to a large extent any appreciable generator noise. In practice, the forces tending to produce the above 2-mode vibration are minimized by maintaining close mechanical tolerances.

Noise due to resonant frequencies of the stator laminations is found to be largely overcome by the use of dual-diameter stator laminations, FIGS. 2A and 2B. By assembling the stator with alternate packets of laminations having comparatively small difference in outside diameter, and by filling the resulting annular groove with a periodic damping material or compound, the resonant frequencies of the two packets are made considerably different; furthermore, the damping and bonding compound tends to oppose resonance in one packet when the other packet is at non-resonant frequency. Furthermore, since the separate packets of lamination have different rigidity or stiffness, any forces present tend to produce different deflections in each packet, and the bonding and damping compound will absorb this energy and reduce the deflections.

A further damping factor is introduced in FIG. 2B wherein the ring 46, preferably bonded to the damping compound 45', constitutes a third member of different resonant frequency and stiffness, further to reduce deflections due to magnetic forces.

Generator unit noise suppression

In addition to the noise that may be caused by vibrations of the generator components as above described, the generator unit proper at normal operating speeds tends to transmit through its mounting high-frequency, low-amplitude vibrations to the engine block, and receives through its drive coupling low-frequency, large-amplitude vibrations from the engine, referring to FIG. 7. This noise source is now substantially eliminated as previously described, referring to FIGS. 1, 6, 6A, and 7 wherein the generator unit mounting and coupling are shown to include vibration damping and isolating means. The vibration frequencies produced by the generator are from 270 to 2700 c.p.s. for the generator speed range 1,000 to 10,000 r.p.m. Isolation is provided by making the resonant frequency of the rubber mount at 32, FIG. 1, approximately 200 c.p.s. in order to attenuate the lowest frequency vibrations. This resonant frequency is above that which would be excited by engine comparatively low-frequency vibration. As a practical matter, we have found that this resonant frequency of 200 c.p.s. gives the mount sufficient rigidity to maintain good belt alignment.

Furthermore, by mounting the generator entirely from the drive-end support, the free-end structure including the stator assembly can vibrate freely, thus tending to minimize material transmission of vibration to the engine. This factor has the greatest effect at lower frequencies.

It should be understood that this invention is not limited to specific details of construction and arrangement thereof herein illustrated, and that changes and modifications may occur to one skilled in the art without departing from the spirit of the invention. For example, the form of the mechanical damping and vibration isolating mounting for the generator unit is not limited to that shown in FIG. 1. An alternative form shown by FIG. 8 may be used wherein the support sleeve 33' depending from the main generator bracket 33, FIG. 1, is carried as before between vertical mounts 32a' and 32b' by a through-bolt 32e'. The vertical mounts are integral with the horizontal base portion 32i' which together comprise the main base support 32'. This support is composed of steel strap and is rigidly secured as indicated to the engine block or fixed base E.

For vibration damping and isolation the base portion 32i' is conveniently extended to form a return-loop portion 32j having a depending portion 32k positioned between the sleeve 33' and vertical mount 32b'. This portion 32k is apertured in alignment with the clamping bolt 32e'. A pair of rubber aperiodic damping washers 32g' 32e'. A pair of rubber aperiodic damping washers 32g' isolate the vertical mount 32b' as shown so that in the assembled clamped position an effective vibration isolating mounting is interposed between the generator and the engine block.

For so isolating the generator vibration from the engine, the main steel base mount 32' has a natural frequency less than 200 c.p.s. It is constructed so as to have a high degree of stiffness in the direction of belt pull while having a low natural frequency in the direction of tangential vibration from the generator. That is, the cross-sectional areas and the lengths respectively of the more resilient portions 32a', 32i', and 32j are selected to give a resonant frequency of below 200 c.p.s., and the main vertical mount 32b' is made comparatively rigid. As this mount is coupled to the generator mounting bolt 32e' by aperiodic material, it cannot transmit to the generator to any material extent the comparatively large-displacement, low-frequency vibration produced by combined belt and engine vibration; also the above coupling isolates the low-displacement, high-frequency vibrations of the generator unit from the engine block.

Other modifications within the spirit of the invention will be apparent; for example, the so-called aperiodic O-ring 24a, FIG. 1, for frictional lateral damping of the rotor bearings may, if desired, have an elongated rectangular form to apply increased surface friction at the outer bearing race, and the outer bearing may be mechanically biased toward the support bearing 25 by any suitable resilient or spring means.

The terms "forcing frequencies" and "minimum static torque" as used herein are defined respectively as the resulting mechanical frequencies above described, and the torque that is due to the field flux when field current is flowing. This torque will assume various values, sometimes positive and sometimes negative, as the rotor moves to different angular positions with respect to the stator. Its average value over the total rotor circumference is zero if no current flows in the power windings.

What is claimed is:

1. A quiet alternator of the flux-switch type for operating at low audible noise level, comprising a stator composed of an annular, magnetic laminated structure having spaced slots in its inner peripheral surface for both field and power windings, a coacting disc-like rotor concentrically mounted within said stator and spaced therefrom by a radial air gap, said rotor composed of magnetic material and having transverse slots forming circumferentially spaced teeth at the rotor periphery for flux-switching of the stator magnetic field in accordance with rotor speed, the number of the rotor teeth being one-half the number of the stator slots, a shaft for said rotor having two supporting bearings symmetrically located at opposite sides of the rotor disc, a fixed mount structure extending transversely of the shaft at the drive-end thereof and supporting one of said bearings therein, the stator being secured to the transverse fixed mount at one side thereof, and having at its opposite side a second transverse support secured thereto for the other shaft bearing so that the corresponding end of the rotor shaft is supported in free-hanging cantilever manner through the aforesaid fixed mount, stator and second support, and aperiodic means included in the fixed mount for isolating vibration of the alternator.

2. A quiet alternator as specified in claim 1 wherein the shaft bearing and rotor combination is biased laterally toward the fixed mount by a slight displacement of the rotor from normal alignment with the stator in direction toward the free-end bearing, thereby to produce lateral magnetic bias toward the fixed mount, during operation of the alternator, and said magnetic bias is supplemented by spring means interposed between the free-end bearing and its support for applying a constant resilient bias for minimizing axial vibration.

3. A quiet alternator as specified in claim 1 wherein the stator structure comprises stacked circular laminations forming a stator ring that is supported laterally at opposite sides of the ring, the ratio of the disc surface area (in square inches) of a stator lamination as determined by the outside diameter thereof, to the radial depth (in inches) of the stator ring exclusive of stator teeth being greater than the ratio of the number 18,800 to the upper limit of alternator frequency (in c.p.s) at which quiet operation is required.

4. A quiet alternator as specified in claim 1 wherein the rotor tooth height is in excess of twenty times the air gap length between aligned rotor and stator teeth, thereby to ensure minimum flux leakage between said aligned teeth.

5. A quiet alternator as specified in claim 1 wherein the drive end of the rotor shaft is adapted to be connected to an engine through a drive belt, the alternator being bodily movable for varying belt tension, and a belt-tension adjusting arm interconnecting the alternator and engine, said arm including a vibration damping portion for precluding transmission of vibration from the alternator to the engine.

6. A quiet alternator as specified in claim 1 wherein the rotor teeth are skewed with respect to the longitudinal axis of the rotor shaft in amount equal to 15% to 25% of the rotor slot pitch.

7. A quiet alternator as specified in claim 6 wherein the rotor has cooling passages disposed at an angle with respect to the rotor shaft corresponding to the angle of tooth skewing, said passages at their opposite ends being in alignment with direction of air flow through respective cooling vents at opposite ends of the alternator.

8. A quite alternator as specified in claim 1 wherein the rotor tooth width is 45% to 55% of the stator pole pitch.

9. A quiet alternator as specified in claim 8 wherein the rotor tooth surface is concentric with the circular path of the rotor periphery for a length equal to the width of a stator tooth, and the rotor tooth at its leading and trailing ends is of decreasing height respectively, such that the increase in the flux leakage between the tooth leading end and the corresponding stator tooth is the same as the decrease in the main flux between the tooth trailing end and the preceding stator tooth as the air gap reluctance to the main flux increases at said trailing end, thereby to maintain substantially constant the main flux as the rotor is advanced and so minimize forcing frequencies caused by tangential forces resulting from field flux change.

10. A quiet alternator as specified in claim 1 wherein the stator is composed of different diameter laminations alternately stacked transversely of the stator ring, and the annular space so formed at the outer periphery of the stator ring is filled with aperiodic damping material.

11. A quiet alternator as specific in claim 10 wherein a stiffening ring having a resonant frequency different from the lamination frequencies also is disposed in the aforesaid annular space so as to be separated from the laminations by said damping material.

12. A quiet alternator as specified in claim 1 wherein the stator is clamped between two end-plates, one of which forms part of the fixed mount and supports the drive-end bearing generally in its plane, and the second end-plate supports the other bearing, also generally in its plane, whereby the rotor unit is in over-hanging cantilever relation to the fixed mount.

13. A quiet alternator as specified in claim 12 wherein the shaft bearings are of the concentric race and ball type, and aperiodic friction means are disposed between the outer race and end plate respectively so that each friction means resists axial movement of the corresponding rotor bearing in both directions.

14. A quiet multi-pole alternator of the flux-switch type comprising a stator ring having teeth spaced along its inner periphery, said stator ring carrying field and power windings in the slots formed between said teeth, a coacting rotor disposed within said stator ring and having teeth in number half the number of stator teeth, a rotor shaft having two main bearings, a support bracket for each bearing in vertical alignment therewith at opposite sides of said rotor means for axially and radially damping each bearing with respect to its bracket, and means for clamping said stator ring between said brackets, one of said brackets having a fixed damped mounting support and the other bracket being supported only by the stator ring and fixed bracket in cantilever manner.

References Cited by the Examiner

UNITED STATES PATENTS

| | | | |
|---|---|---|---|
| 490,809 | 1/1893 | Lundell | 310—268 |
| 1,861,059 | 5/1932 | Johnson | 310—211 |
| 2,027,402 | 1/1936 | Roach | 310—268 X |
| 2,235,903 | 3/1941 | Schonfelder | 310—51 X |
| 2,412,254 | 12/1946 | Edelman | 310—268 |
| 2,438,629 | 3/1948 | Anderson | 310—268 |
| 2,847,593 | 8/1958 | Selbach et al. | 310—90 |
| 2,990,483 | 6/1961 | Shildneck | 310—64 |
| 3,062,979 | 11/1962 | Jarret et al. | 310—168 |
| 3,113,230 | 12/1963 | Linkous | 310—211 |
| 3,114,060 | 12/1963 | Goettl | 310—51 |

ORIS L. RADER, *Primary Examiner.*

MILTON O. HIRSHFIELD, *Examiner.*

D. F. DUGGAN, *Assistant Examiner.*